(12) United States Patent
Nyamagouda et al.

(10) Patent No.: US 12,235,795 B2
(45) Date of Patent: Feb. 25, 2025

(54) FILE SYSTEM PROVISIONING FOR WORKLOAD

(71) Applicant: HEWLETT PACKARD ENTERPRISE DEVELOPMENT LP, Houston, TX (US)

(72) Inventors: Sagar Venkappa Nyamagouda, Karnataka (IN); Smitha Jayaram, Karnataka (IN); Hiro Rameshlal Lalwani, Karnataka (IN); Rachit Gupta, Karnataka (IN); Sherine Jacob, Karnataka (IN); Anand Andaneppa Ganjihal, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 27 days.

(21) Appl. No.: 17/816,276

(22) Filed: Jul. 29, 2022

(65) Prior Publication Data
US 2024/0037067 A1 Feb. 1, 2024

(51) Int. Cl.
*G06F 16/13* (2019.01)
*G06F 11/34* (2006.01)

(52) U.S. Cl.
CPC .......... *G06F 16/13* (2019.01); *G06F 11/3414* (2013.01)

(58) Field of Classification Search
CPC ....... G06F 16/13; G06F 11/3414; G06N 3/02; G06N 20/00
See application file for complete search history.

(56) References Cited

U.S. PATENT DOCUMENTS

| | | | | |
|---|---|---|---|---|
| 2005/0086450 A1* | 4/2005 | Shiota | G06F 12/1027 | 711/207 |
| 2015/0205637 A1* | 7/2015 | Lee | G06N 20/10 | 718/105 |
| 2015/0326500 A1* | 11/2015 | Jackson | H04L 67/1008 | 709/226 |
| 2015/0379420 A1* | 12/2015 | Basak | G06F 16/11 | 706/12 |
| 2020/0104189 A1* | 4/2020 | Gopalan | G06F 9/5088 | |
| 2020/0234144 A1* | 7/2020 | Such | G06F 18/217 | |
| 2020/0242000 A1* | 7/2020 | Khosrowpour | G06F 11/3608 | |
| 2022/0043752 A1* | 2/2022 | Hua | G06N 20/00 | |

(Continued)

OTHER PUBLICATIONS

J. Gao, H. Wang and H. Shen, "Machine Learning Based Workload Prediction in Cloud Computing," 2020 29th International Conference on Computer Communications and Networks (ICCCN), Honolulu, HI, USA, 2020, pp. 1-9, doi: 10.1109/ICCCN49398.2020. 9209730. (Year: 2020).*

(Continued)

*Primary Examiner* — Cheyne D Ly
(74) *Attorney, Agent, or Firm* — Trop, Pruner & Hu, P.C.

(57) ABSTRACT

In some examples, a system receives workload information of a workload collection, and applies a machine learning model on the workload information, the machine learning model trained using training information including features of different types of workloads. The system produces, by the machine learning model, an identification of a first file system from among different types of file systems, the machine learning model producing an output value corresponding to the first file system that is a candidate for use in storing files of the workload collection.

20 Claims, 5 Drawing Sheets

(56) References Cited

U.S. PATENT DOCUMENTS

| | | | |
|---|---|---|---|
| 2022/0261295 A1* | 8/2022 | Nagaraja | G06F 18/23 |
| 2022/0334944 A1* | 10/2022 | Martynov | G06F 16/11 |
| 2023/0022884 A1* | 1/2023 | Faizian | G06F 11/302 |
| 2023/0069593 A1* | 3/2023 | Sherwood, Jr. | G06F 9/5077 |
| 2023/0236946 A1* | 7/2023 | Li | G06F 11/3442 |
| | | | 718/104 |
| 2023/0281470 A1* | 9/2023 | Hwang | G06F 11/3433 |
| | | | 706/12 |

OTHER PUBLICATIONS

Dryden et al., Clairvoyant Prefetching for Distributed Machine Learning I/O, pp. 1-14, SC'21, Nov. 14-19, 2021, St. Louis, MO. (Year: 2021).*

Vaghani, S., Virtual machine file system, ACM SIGOPS Operating Systems Reviewvol. 44Issue Dec. 4, 2010pp. 57-70. (Year: 2010).*

Active State, "What is a Keras model", Jul. 11, 2022, retrieved from: https://www.activestate.com/resources/quick-reads/what-is-a-keras-model/, pp. 20.

Ajagekar, A., "Adam", Cornell University Computational Optimization Open Textbook last edited on Dec. 16, 2021, retrieved from: https://optimization.cbe.cornell.edu/index.php?title=Adam&oldid=6033, pp. 7.

Amazon Web Services; "Choosing an Amazon FSx File System"; retrieved from: https://aws.amazon.com/fsx/when-to-choose-fsx/, retrieved on: Jun. 7, 2022, pp. 8.

Amazon Web Services; "Select the Correct Resource Type, Size, and Number"; retrieved from: https://docs.aws.amazon.com/wellarchitected/latest/cost-optimization-pillar/select-the-correct-resource-type-size-and-number.html, retrieved on Jun. 16, 2022, pp. 2.

Bannier, Understanding Adam: how loss functions are minimized? Adam : a method for stochastic optimization, Towards Data Science, Aug. 10, 2019 retrieved from: https://towardsdatascience.com/understanding-adam-how-loss-functions-are-minimized-3a75d36ebdfc, pp. 2.

Google LLC, "Parallel file systems for HPC workloads", retrieved from: https://cloud.google.com/architecture/parallel-file-systems-for-hpc, retrieved on: Jun. 7, 2022, pp. 7.

Jayakumar, N., et al., "Workload Characteristics Impacts on file System Benchmarking", International Journal of Advanced Research in Computer Science and Software Engineering, vol. 4, Issue 2, Feb. 2014, pp. 39-44.

Ozmen, O., et al., "Workload-aware storage layout for database systems", SIGMOD '10: Proceedings of the 2010 ACM SIGMOD International Conference on Management of data, Jun. 15, 2010, pp. 939-950.

Raul Gomez Blog, Understanding Categorical Cross-Entropy Loss, Binary Cross-Entropy Loss, Softmax Loss, Logistic Loss, Focal Loss and all those confusing names, May 23, 2018, pp. 1-12.

Seo, B., et al., IO Workload Characterization Revisited: A Data-Mining Approach, IEEE, vol. 63, Issue 12, Dec. 2014, pp. 3026-3038.

Wikipedia, "AdvFS", retrieved from: https://en.wikipedia.org/wiki/AdvFS, retrieved on: Sep. 27, 2022, pp. 3.

Wikipedia, "Deep learning", retrieved from: https://en.wikipedia.org/wiki/Deep_learning, retrieved on; Sep. 27, 2022, pp. 1-40.

Wikipedia, "ext4", retrieved from: https://en.wikipedia.org/wiki/Ext4, retrieved on: Sep. 27, 2022, pp. 9.

Yalcin, O.G., "3 Ways to Build Neural Networks in TensorFlow with the Keras API", Towards Data Science, retrieved from: https://towardsdatascience.com/3-ways-to-build-neural-networks-in-tensorflow-with-the-keras-api-80e92d3b5b7e, Sep. 28, 2020, pp. 1-15.

Zhu, Y., "A novel approach to workload prediction using attention-based LSTM encoder-decoder network in cloud environment", EURASIP Journal on Wireless Communications and Networking, Dec. 17, 2019, pp. 1-18.

* cited by examiner

FILE SYSTEM PROVISIONING FOR WORKLOAD

BACKGROUND

A file system includes data structures that organize and store data in the form of files and directories. Additionally, a file system includes interface and control components that manage the storing, retrieval, and other operations on data stored in the file system. A requester (e.g., a user, a program, or a machine) can issue requests to access files of a file system that is deployed in a computer.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Workloads that access files can execute in different computing environments. For example, workloads may execute in a cloud environment, a web environment, a data center on premises of an enterprise (e.g., a business concern, a government agency, an educational organization, an individual, etc.), a home environment, and so forth. In further examples, workloads can execute in an individual computer, such as a user computer.

A "file" can refer to a collection of data that is individually identifiable, such as with a file name or other identifier.

Workloads may be associated with different input/output (I/O) characteristics. Examples of I/O characteristics include any or some combination of the following: a read I/O size (which refers to the size of data, including files, accessed in a read operation), a write I/O size (which refers to the size of data accessed in a write operation), whether a workload is read intensive or write intensive (a workload is read intensive if there are more read operations in the workload than write operations, and a workload is write intensive if there are more write operations than read operations in the workload), an I/O pattern, and so forth.

In some examples, a read/write ratio can be used to indicate whether a workload is read intensive or write intensive. The read/write ratio can refer to a ratio of a quantity of read I/O accesses to a quantity of write I/O accesses. In such an example, if the read/write ratio of a given workload is greater than 1 (or more generally, greater than a threshold 1.x, where x>0), then the given workload is considered to be read intensive. On the other hand, if the read/write ratio of a given workload is less than 1 (or more generally, less than a threshold 1.x, where x>0), then the given workload is considered to be write intensive. In other examples, a read/write ratio can refer to a ratio of a quantity of write I/O accesses to a quantity of read I/O accesses.

Examples of different I/O patterns can include a sequential I/O pattern (in which data is accessed in a sequence of consecutive addresses), a random I/O pattern (in which data is accessed at various different addresses that are non-consecutive), a parallel I/O pattern (in which data access occurs in parallel to multiple different addresses), a truncate I/O pattern (in which data written to a storage medium is truncated from an original size of the write data (data is truncated if the amount of data is reduced), a write once pattern (in which any data portion is written once to a storage system and not overwritten later), and/or other I/O patterns.

A data "access" can refer to either or both of a read of data or a write of data.

Different I/O characteristics of workloads may also be due to different behaviors of the workloads. Some workloads may be data intensive, e.g., the workloads perform a relatively larger quantity of I/O accesses of data stored in a storage system and a relatively smaller quantity of data communications over a network. Other workloads may be communication intensive, e.g., the workloads perform a relatively larger quantity of data communications over networks, and a relatively smaller quantity of I/O accesses of data stored in a storage system. Further workloads may be computation intensive, e.g., the workloads perform a relatively larger quantity of computations (e.g., data sorting, mathematical calculations based on data, etc.) on data read from or to be written to a storage system.

A "storage system" can refer to an arrangement of one or more storage devices, such as disk-based storage devices, solid state drives, and so forth.

Various different types of file systems are available to manage the access and storage of data in a storage system. Examples of different types of file systems include file systems provided by different operating systems (OSs), such as the WINDOWS OS, the LINUX OS, and so forth. Further examples of file systems include the Tru64 UNIX Advanced File System (AdvFS), the SimpliVity file system (SvtFS), the MapR file system (MapR FS), a log structured file system (LFS), a high-performance computing (HPC) file system, and so forth.

Although various example file systems are listed above, it is noted that in further examples, there can be additional or alternative file systems.

A file system can store files in a hierarchical arrangement in which files are stored in directories. Some directories may be sub-directories of other directories. A location of a file in the file system may be specified by a file path, which includes the file name of the file and a string of one or more directory names that identify one or more directories containing the file.

Depending upon I/O characteristics of workloads, some workloads may perform better with a first type of file system as compared to a different second type of file system. The performance of a workload can be represented using a performance measure such as latency, where latency can refer to an amount of delay from when a workload is started or requested to when the workload completes. Other performance measures can include any or some combination of the following: an I/O rate (rate of accessing data in a storage system), resource usage by a workload (e.g., usage of processing resources, usage of communication resources, usage of storage resources, etc.), or other measures of performance of workloads that access data of file systems.

In some examples, a human administrator may manually select a type of file system (from multiple different types of file systems) to use for a target workload. A "target workload" can refer to a workload that has been requested or that is expected to be launched. If a non-optimal file system is selected for the target workload, then the target workload when executed with the selected file system may experience low performance (e.g., high latency).

In accordance with some implementations of the present disclosure, a system applies workload information of a target workload (e.g., a workload that is expected to be deployed) to a machine learning model trained using training information including features of different types of workloads. The machine learning model produces an identification of a file system for storing files of the workload, based on a selection by the model from different types of file systems.

The identification of the file system is used in on-demand provisioning of the file system for use with the target workload. On-demand provisioning of a file system can refer to provisioning the file system as workloads are received, in contrast to examples where a file system is pre-provisioned and designated for use with a workload regardless of whether or not performance of the workload may suffer with use of the file system.

Figure 1:
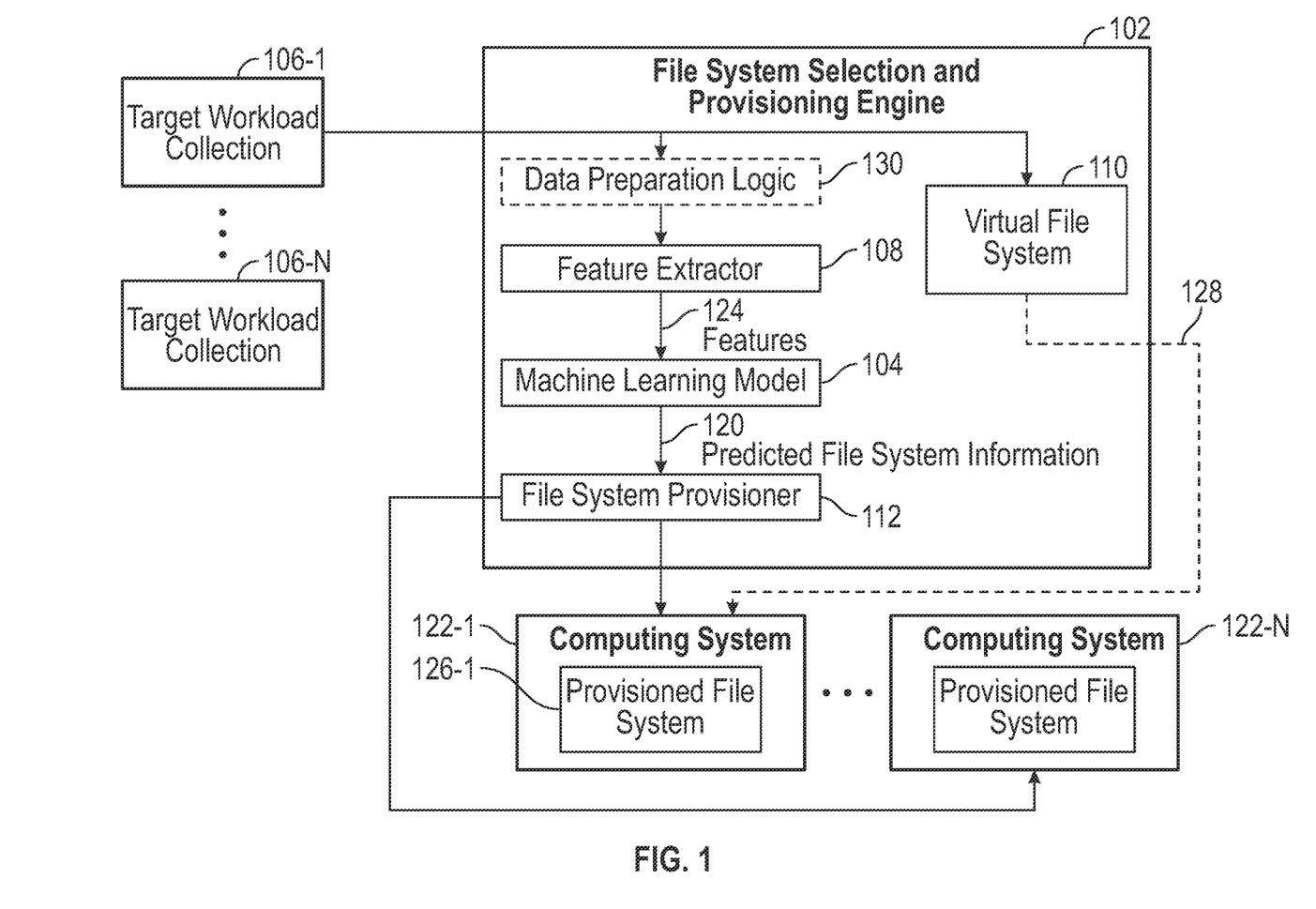
FIG. 1 is a block diagram of an arrangement that includes a file system selection and provisioning engine that selectively provisions from among multiple different types of file systems for a workload, in accordance with some examples.

FIG. 1 is a block diagram of an example arrangement that includes a file system selection and provisioning engine 102 that includes a machine learning model 104 that provides file system information 120 to allow an identification of which file system of multiple different types of file systems to employ for a target workload. The file system selection and provisioning engine 102 can perform on-demand provisioning of file systems for workloads.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The file system selection and provisioning engine 102 can be implemented with a computer or multiple computers. The components of the file system selection and provisioning engine 102 (e.g., 130, 108, 104, 112, and 110) may be implemented using machine-readable instructions executed by the one or more hardware processing circuits of the file system selection and provisioning engine 102.

In some examples, the file system selection and provisioning engine 102 can be deployed in an enterprise computing environment (a computing environment of an enterprise such as a business concern, government agency, educational organization, an individual, etc.) to intelligently select file systems to use for respective workloads.

In other examples, the file system selection and provisioning engine 102 can be deployed "as a service (aaS)" by a service provider, in which the services of the file system selection and provisioning engine 102 are available, such as in the cloud, on the web, etc., for access by users (also referred to as "customers" or "tenants") of the aaS.

When a user (which can refer to a human, a program, or a machine) desires to provision a file system for a target workload collection (which can include a target workload or multiple target workloads), the user can issue a request (with information of the target workload collection) to the file system selection and provisioning engine 102, which selects a file system for the target workload collection and provisions a file system for the target workload collection.

FIG. 1 shows several different example target workload collections 106-1 to 106-N (N≥1). Examples of target workloads in the target workload collections can include any of the following: a video recording and streaming workload, which can record video images and stream video images to output devices; a healthcare workload that manages healthcare records; a virtual desktop infrastructure (VDI) workload that provides and manages virtual desktops on remote devices such as user devices; a banking workload that manages banking records; an insurance workload that manages insurance records; a machine learning or artificial intelligence workload (for data analytics) that manages access of data relating to machine learning or artificial intelligence; a database workload that manages relational database records; an email server workload that manages emails; and/or any other types of workloads.

Each different type of workload can also be referred to as a "workload domain." For example, a first type of workload can be a workload of a first workload domain, a second type of workload can be a workload of a second workload domain, and so forth.

Initially, no information is available to identify the type of workload(s) present in each target workload collection. Thus, initially, no information is available to make an intelligent selection of which of multiple different types of file systems should be used for any given target workload collection.

In the example of FIG. 1, the target workload collection 106-1 is input (e.g., from a user computer) to the file system selection and provisioning engine 102 for the purpose of selecting and provisioning a file system for the target workload collection 106-1. Other target workload collection(s) (including 106-N) can similarly be input to the file system selection and provisioning engine 102 for the purpose of selecting and provisioning a file system for the other target workload collection(s).

"Selecting" a file system refers to choosing, from among multiple different types of file systems, a file system to use for storing and managing data (files) of a target workload collection. "Provisioning" a file system can refer to either (1) creating the file system in a computing system (e.g., any of computing systems 122-1 to 122-N) to use for storing and managing data of the workload; or (2) identifying the file system that was previously created to use for storing and managing data of the workload. A file system can be created using any of various tools (e.g., open-source tools or tools provided by vendors of file systems, OSs, or computing systems) to create file systems. Such a file system creation tool may be part a file system provisioner 112 that can be included in the file system selection and provisioning engine 102 or can be separate from the file system selection and provisioning engine 102.

A "computing system" can refer to a single physical computer, a collection of physical computers, a virtual computing entity (e.g., a virtual machine (VM), a container, etc.), or a collection of virtual computing entities.

In some examples, the target workload collection 106-1 may be a new target workload collection that a user desires to execute. In some examples, the target workload collection 106-1 includes I/O requests, where each I/O request can specify the type of operation (read or write), a size of data that is the subject of the access (e.g., the I/O request can include a size field that specifies the data size, or the I/O request can include address information that identifies address(es) where the data access is to occur so that the data size of the I/O request can be derived), and possibly other information.

In addition to I/O requests, a target workload collection also includes metadata associated with the I/O requests, including counts representing a number of reads and/or a number of writes, information relating to an I/O pattern (e.g., sequential, parallel, random, truncate, write once, etc.), and so forth. Such metadata can be derived by an analyzer (separate from the file system selection and provisioning engine 102) that is able to analyze the I/O requests. Alternatively, the metadata can be derived by the file system selection and provisioning engine 102 based on an analysis of the I/O requests in the target workload collection. The analysis performed by the analyzer or the file system selection and provisioning engine 102 can be based on counting the quantity of read requests, counting the quantity of write requests, computing a read/write ratio based on the counts, analyzing addresses in the I/O requests to determine whether the reads or writes are sequential, parallel, or random, analyzing the I/O requests to determine whether truncation is performed, analyzing the I/O requests to identify indicators (e.g., flags) that indicate data portions that are write once, and so forth.

The file system selection and provisioning engine 102 includes a feature extractor 108 that receives the target workload collection 106-1. The feature extractor 108 extracts features 124 that are to be used by the machine learning model 104 of the file system selection and provisioning engine 102 for identifying a file system (from among multiple different types of file systems) that is predicted to most likely optimize performance of the target workload collection 106-1. The features that are extracted can include a subset of all possible features that may be used. By selecting just the subset (less than all) of all possible features, the number of dimensions to be considered by the machine learning model 104 can be reduced for more efficient execution of the machine learning model 104. The features that are selected for use are preselected, such as by a human or another entity. The machine learning model 104 is trained using a training data set that includes the features (discussed further below in connection with FIG. 2).

The extracted features 124 can include any or some combination of the following: a read I/O size, a write I/O size, a read/write ratio representing whether a workload is read intensive or write intensive, an I/O pattern (e.g., sequential, random, parallel, truncate, write once, etc.), and/or other features (e.g., data intensive, or communication intensive, or computation intensive).

The extracted features 124 can be included in feature vectors. For example, features extracted from a first I/O request (or first group of I/O requests) can be included in a first feature vector, features extracted from a second I/O request (or second group of I/O requests) can be included in a second feature vector, and so forth. Each feature vector includes a collection of features.

The feature extractor 108 provides the extracted features 124 (extracted from the target workload collection 106-1 and included in feature vectors) to the machine learning model 104. In some examples, the machine learning model 104 is a neural network, such as a neural network build using TensorFlow. TensorFlow includes an open-source set of libraries that can be used to create and work with neural networks. In some examples, a Keras application programming interface (API) that interacts with TensorFlow can be used to implement neural networks.

In other examples, other types of machine learning models can be used in the file system selection and provisioning engine 102, such as a boosted trees regression model, a distance-based clustering model, a glass box local weighted regression model, and so forth.

More generally, a "machine learning model" refers to a model (implemented with machine-readable instructions and parameters) that can be updated by learning (training) the model. For example, a neural network has weights and biases (examples of parameters) that can be updated based on training the neural network. A machine learning model can be initially trained using an initial training data set. Afterwards, once the machine learning model has been deployed and used, the machine learning model can continue to be trained, such as by providing further training data based on outputs produced by the machine learning model.

Based on the extracted features 124 (or more specifically, based on the feature vectors that contain the extracted features 124), the machine learning model 104 can identify the workload domain of the workload(s) of the target workload collection 106-1. For example, the machine learning model 104 can identify that the target workload collection 106-1 is in one of the following workload domains: video recording and streaming workload domain, healthcare workload domain, VDI workload domain, banking workload domain, insurance workload domain, machine learning or artificial intelligence workload domain, database workload domain, email server workload domain, and so forth.

More generally, the machine learning model 104 can identify a collection of workload domains (a single workload domain or multiple workload domains) that the target workload collection 106-1 is part of. In some examples, the machine learning model 104 can assign a probability value to each workload domain of the collection of workload domains. The probability value assigned to a given workload domain indicates a likelihood that the target workload collection 106-1 is part of the given workload domain.

Based on the identified collection of workload domains (and any probability value(s) assigned to each workload domain of the identified collection of workload domains), the machine learning model 104 produces predicted file system information 120, which identifies a collection of file systems (a single file system or multiple file systems) that may potentially be used for the target workload collection 106-1. Mapping information may be available to the machine learning model 104 to map workload domains to respective file systems. The mapping information may be in the form of a mapping table, for example. Each entry of the mapping table can correlate a workload domain to a corresponding type of file system. Thus, given the collection of workload domains identified for the target workload collection 106-1, the machine learning model 104 can access the mapping information to map the collection of workload domains to respective type(s) of file system(s).

Note that the mapping information may map multiple different workload domains to a given type of file system, and/or may map a workload domain to multiple different types of file systems.

As an example, the predicted file system information 120 output by the machine learning model 104 can include a collection of file system labels (one file system label or multiple file system labels), where each file system label represents a file system that is a candidate for use with the target workload collection 106-1. In examples where the collection of file system labels includes multiple file system labels that represent respective different types of file systems, the predicted file system information 120 can also include values (e.g., probability values) assigned by the machine learning model 104 to the respective file system labels, to indicate which file system of the different types of file systems should more preferentially be used with the target workload collection 106-1. For example, a first file system label representing a first type of file system may be assigned a first probability value, and a second file system label representing a second type of file system may be assigned a second probability value. If the first probability value is less than the second probability value, then that would indicate that it would be more preferable to use the second type of file system for the target workload collection 106-1, as compared to the first type of file system.

The machine learning model 104 outputs the predicted file system information 120 to the file system provisioner 112. In examples where the predicted file system information 120 identifies a single file system, the file system provisioner 112 provisions the identified file system in a computing system. For example, the file system provisioner 112 provisions a file system 126-1 in the computing system 122-1. The file system 126-1 (which was provisioned on-demand) is to store and manage files for the target workload collection 106-1.

The file system provisioner 112 can provision the file system 126-1 in the computing system 122-1 by either (1) creating the file system 126-1 in the computing system 122-1, or (2) identifying the file system 126-1 that was previously created to use for storing and managing data of the target workload collection 106-1.

In further examples where the predicted file system information 120 identifies multiple file systems (along with values such as probabilities indicating predicted performance levels of the multiple file systems), the file system provisioner 112 can compare the values indicating predicted performance levels of the multiple file systems and select the file system with a value that indicates optimal performance (from among the multiple file systems). The file system provisioner 112 can provision the selected file system, such as in the computing system 122-1.

FIG. 1 further shows that the file system provisioner 112 has provisioned a file system 126-N in the computing system 122-N, such as for the target workload collection 106-N.

For the target workload collection 106-1, the file system provisioner 112 can create a mount point at which the provisioned file system 126-1 is accessible. In some examples, a "mount point" can refer to a location (e.g., a directory or a file) of a root directory of a file system. The mount point allows another entity, such as a system that launched the target workload collection 106-1, to access the provisioned file system 126-1. More generally, the file system provisioner 112 can establish a connection between an entity, such as the system that launched the target workload collection 106-1, and the provisioned file system 126-1, so that the entity can read and write files in the provisioned file system 126-1.

As an example, a VDI workload may employ data deduplication (in which duplicate data portions such as chunks are not stored multiple times in a storage system) and may be read intensive (i.e., there are more read I/O accesses than write I/O accesses in the VDI workload). In some examples, a workload that employs data deduplication and is read intensive may perform better in the SimpliVity file system (SvtFS), and may perform more poorly with the AdvFS file system or the MapR FS. As a result, the machine learning model 104 may indicate an SvtFS be provisioned on-demand for the VDI workload.

On the other hand, in another example, a data analytics workload (that employs artificial intelligence) may perform better in the MapR FS, as compared to other types of file systems. As a result, the machine learning model 104 may indicate a MapR FS be provisioned on-demand for the data analytics workload.

The file system provisioning engine 102 can also include a virtual file system 110 (or equivalently a temporary file system). For example, the virtual file system 110 can be an Ext4 FS file system (which is a journaling file system that logs files to a journal) or another type of file system (e.g., AdvFS, etc.). The virtual file system 110 performs I/O buffering to buffer I/O requests (e.g., in the form of files where each file includes an I/O request of a target workload) of a target workload collection received by the file system provisioning engine 102.

Once the file system 126-1 is provisioned on-demand for the target workload collection 106-1, the file system selection and provisioning engine 102 can release the I/O requests of the target workload collection 106-1 buffered in the virtual file system 110 along path 128 to the provisioned file system 126-1 to execute the read and write accesses of the I/O requests. The path 128 can include a network that couples the file system selection and provisioning engine 102 to the computing system 122-1. More specifically, the file system selection and provisioning engine 102 can send each buffered I/O request in the virtual file system 110 over the path 128 to the provisioned file system 126-1 in the computing system 122-1.

More generally, instead of using the virtual file system 110, I/O buffers can be used instead to temporarily buffer the I/O requests of the target workload collection 106-1. The I/O requests are buffered while the file system selection and provisioning engine 102 performs the selection and on-demand provisioning of a file system for the target workload collection 106-1.

In some examples, the file system selection and provisioning engine 102 further includes data preparation logic 130. In other examples, the data preparation logic 130 can be omitted.

The data preparation logic 130 can apply data preparation processing on information of the target workload collection 106-1, such as information in the I/O requests in the target workload collection 106-1. I/O requests of different target workload collections may have different formats, may use different ranges of values of various variables in the I/O requests, may employ different variable names, and so forth. Also, I/O requests in one target workload collection may have information not found in I/O requests of another target workload collection. The data preparation processing applied by the data preparation logic 130 on the information of the target workload collection 106-1 can include cleansing the information (e.g., to remove extraneous information, such as information found in I/O workload requests of one target workload collection not found in I/O requests of another target workload collection), normalizing the information (e.g., normalize values of variables to fall within a common range), and restructuring the information (e.g., to change the format of information in the target workload collection).

The data preparation logic 130 provides workload information after the application of the data preparation processing to the feature extractor 108, which produces the extracted features 124 based on the processed workload information.

Figure 2:
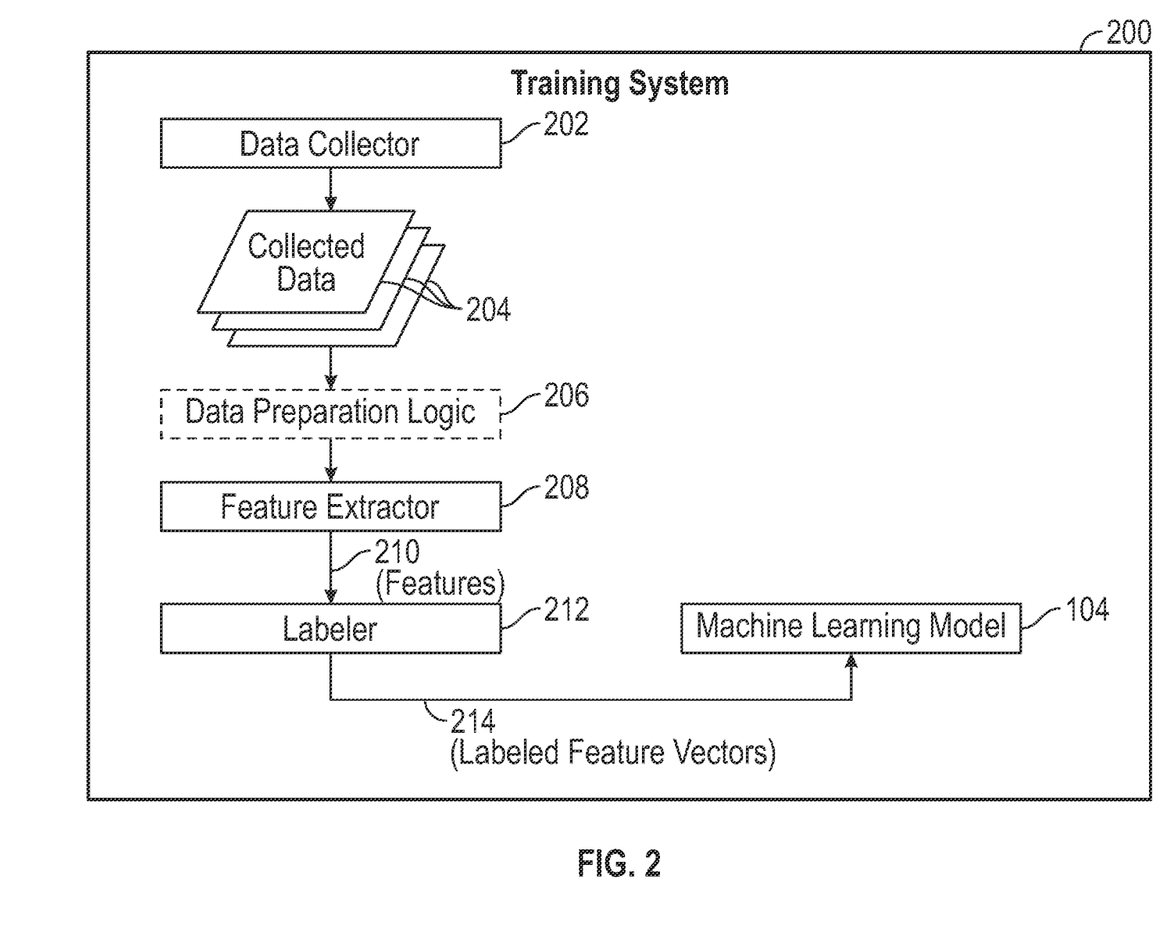
FIG. 2 is a block diagram of a training system of training a machine learning model according to some examples.

FIG. 2 is a block diagram of a training system 200 to train the machine learning model 104 according to some examples. The training system 200 can be implemented using a computer or multiple computers, which can be the same as or different from the computer(s) for implementing the file system selection and provisioning engine 102 of FIG. 1.

The training system 200 can include a data collector 202 that collects data from various sources. For example, the data collector 202 can receive workload information from various monitoring agents deployed in or coupled to various systems (e.g., computing systems similar to 122-1 to 122-N in FIG. 1) to monitor workload information of workloads executed in the monitored systems. The monitored workload information can include I/O requests of the workloads for example. The monitored workload information is considered historical workload information.

The data collector 202 can also receive workload information from human users, such as field or support engineers and/or users of test groups that perform testing of file systems and collect test data. The data collector 202 can also receive workload information of workloads from other sources, such as open-source repositories of workload information, etc. By collecting workload information from various different sources, more diverse workload information can be collected for purposes of training the machine learning model 104.

The data collector 202 produces collected data 204, which includes workload information from the various different sources.

The training system 200 can include a data preparation logic 206 that can apply data preparation processing similar to the processing of the data preparation logic 130 of FIG. 1. In other examples, the data preparation logic 206 can be omitted.

The training system 200 further includes a feature extractor 208 to extract features, similar to the feature extractor 108 of FIG. 1. The feature extractor 208 extracts features 210 from the workload information collected by the various sources. The extracted features 210 are included in respective feature vectors. For example, features extracted from a first I/O request (or first group of I/O requests) from any of the various sources can be included in a first feature vector, features extracted from a second I/O request (or second group of I/O requests) from any of the various sources can be included in a second feature vector, and so forth.

The training system 200 further includes a labeler 212 to add workload domain labels to the feature vectors. The workload domain labels include labels representing the following workload domains, for example: video recording and streaming workload domain, healthcare workload domain, VDI workload domain, banking workload domain, insurance workload domain, machine learning or artificial intelligence workload domain, database workload domain, email server workload domain, and so forth.

The labeler 212 can add a workload domain label to a given feature vector. For example, the labeler 212 can add: a workload domain label representing the video recording and streaming workload domain to a first feature vector, a workload domain label representing the VDI workload domain to a second feature vector, and so forth. Adding a workload domain label to a given feature vector indicates that an I/O request with the features of the given feature vector is part of a workload in the respective workload domain.

The workload domain labels added to respective feature vectors can be based on human input to the labeler 212. For example, a human user can review the feature vectors produced by the feature extractor 208, and can instruct the labeler 212 to add respective workload domain labels to the feature vectors.

Alternatively, the labeler 212 is an automated program that generates workload domain labels and assigns the workload domain labels based on I/O characterization in a data set. The labeler 212 may be developed to generate the labeled training set including labeled feature vectors based on domain expertise programmed into the labeler 212 such that the labeler 212 can characterize I/O requests and assign workload domain labels based on the I/O characterization.

The labeler 212 produces labeled feature vectors 214 that each contains extracted features and a corresponding workload domain label. The labeled feature vectors 214 are provided to the machine learning model 104, which trains the machine learning model 104 to learn that the feature patterns in the labeled feature vectors 214 correspond to respective workload domains. Once trained, the machine learning model 104 can be used in the file system selection and provisioning engine 102 of FIG. 1 to identify workload domains corresponding to feature vectors produced by the feature extractor 108 from a target workload collection.

Figure 3:
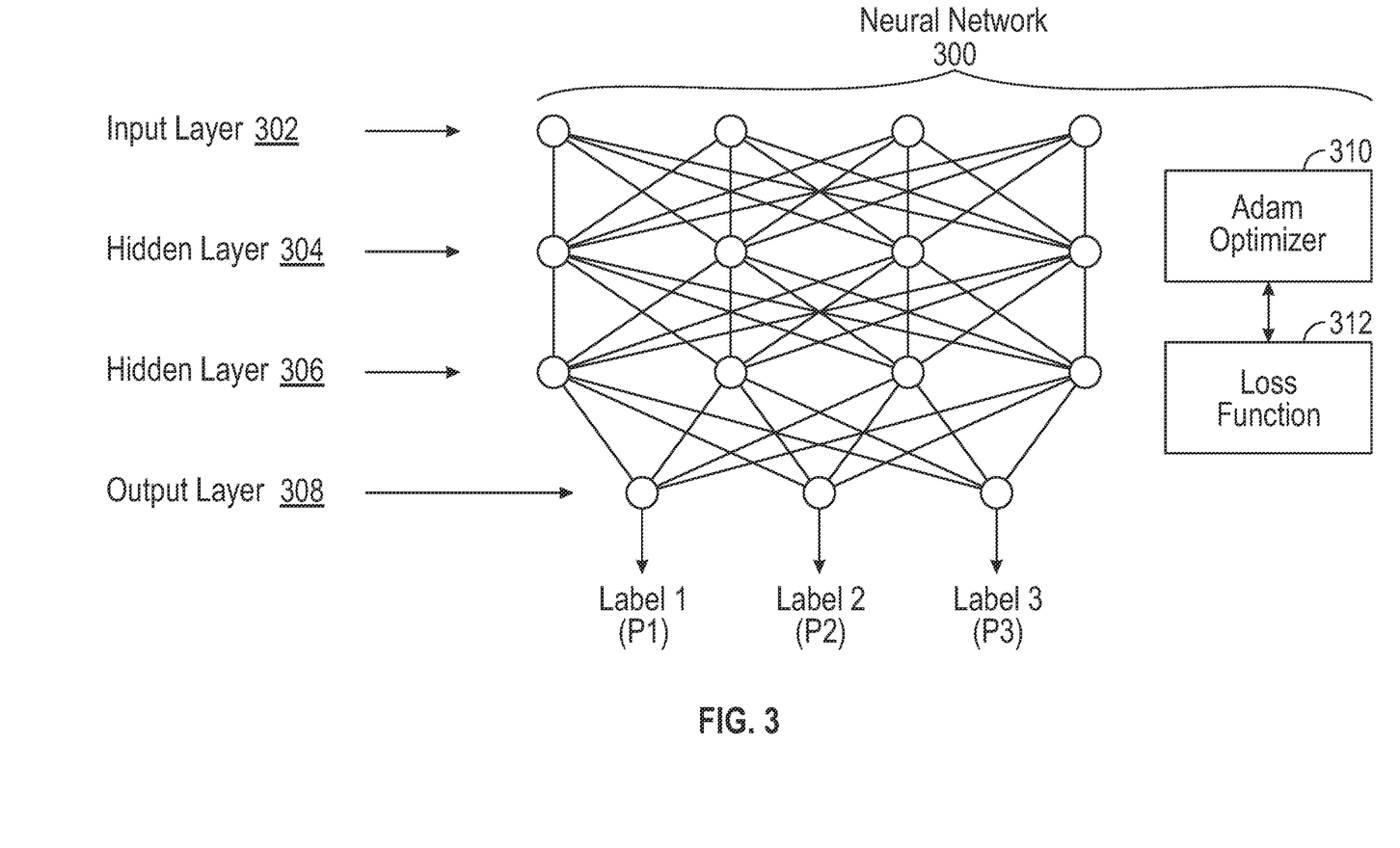
FIG. 3 is a block diagram of a neural network according to some examples.

In some examples, the machine learning model 104 can include a neural network. FIG. 3 shows an example of a neural network 300 for implementing the machine learning model 104, according to some examples. A neural network includes an input layer, one or more hidden layers, and an output layer. Each of the layers include artificial neurons, and the artificial neurons of the layers are interconnected. In the example of FIG. 3, the neural network 300 includes an input layer 302, two hidden layers 304 and 306, and an output layer 308. In other examples, the neural network 300 can include a different quantity of hidden layers.

Also, although FIG. 3 shows each layer with a specific quantity of nodes (artificial neurons), in other examples, a different quantity of nodes can be included in any of the layers of the neural network 300.

Each node, or artificial neuron, connects to another and has an associated weight and bias (also referred to as a threshold). If the output produced by an activation function (a linear function or a nonlinear function) of any individual node is above the specified threshold (bias), that node is activated, sending data to the next layer of the neural network. Otherwise, data is not passed to the next layer of the network.

Each node of a hidden layer (304 or 306) receives an input from a node of a previous layer (either the input layer 302 or a previous hidden layer 304) and similarly produces an output based on application of an activation function. The output is compared by the node in the hidden layer (304 or 306) to a respective bias to determine whether the node in the hidden layer (304 or 306) is to be activated to pass data to the next layer (either another hidden layer 306 or the output layer 308).

The output layer 308 of the neural network 300 can apply a softmax activation function in some examples. "Softmax" refers to a function that converts a vector of values (e.g., from a hidden layer) into a vector of probabilities. The output layer 308 of the neural network can produce M values (M≥1), one for each workload domain label. The softmax activation function normalizes output values from the previous hidden layer and converts such values into probabilities that sum to 1. Each value in the output of the softmax activation function for the output layer 308 is interpreted as the probability of membership for each label.

The hidden layer 308 of the neural network 300 outputs three labels (Label1, Label2, Label3) and probability values P1, P2, P3 associated with the three respective labels.

In some examples, for training the neural network 300, the neural network 300 includes an Adam optimizer 310, which applies an optimization algorithm for updating weights and biases of the nodes of the neural network 300 based on training data, such as the labeled feature vectors 214 of FIG. 2. The Adam optimizer 310 applies a type of stochastic gradient descent optimization for learning a neural network. In other examples, other techniques of training the neural network 300 can be employed.

In some examples, the Adam optimizer 310 uses categorical cross-entropy loss function 312 that computes a loss associated with a prediction performed by the neural network 300. In other examples, other types of loss functions can be employed. The Adam optimizer 310 attempts to minimize (or reduce) the loss computed by the loss function 312 during training of the neural network 300.

In some examples, the neural network 300 can be trained over multiple iterations. After the neural network 300 is trained in a first iteration, the loss function 312 computes a loss for a prediction produced by the neural network 300. If the loss exceeds a loss threshold, then another training iteration is performed, and after the neural network 300 is trained in the next iteration, the loss function 312 computes a loss for a prediction produced by the neural network 300. This loss is again compared to the loss threshold. The training iterates until a loss computed for a current iteration is less than the loss threshold, at which point the training can stop and the trained neural network 300 can be used to provide predictions to select file systems for workloads.

More generally, to train the machine learning model 104, the training system 200 determines a measure of a performance of the machine learning model 104 (an example of this measure is a loss produced by the loss function 312). Responsive to the measure not satisfying a criterion (e.g., the loss exceeding the loss threshold), the training system 200 performs another iteration of the training. The training is re-iterated until a measure of the performance of the machine learning model satisfies the criterion in a current training iteration (e.g., the loss is less than the loss threshold).

In each training iteration, model parameters (e.g., weights and biases of a neural network) are updated.

Figure 4:
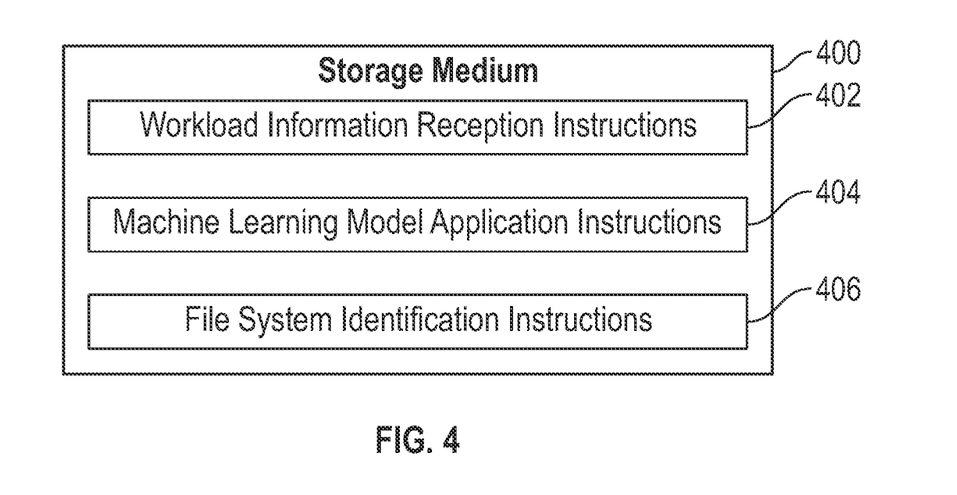
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks. The system can include a computer or multiple computers.

The machine-readable instructions include workload information reception instructions 402 to receive workload information of a workload collection, such as any of the target workload collections 106-1 to 106-N of FIG. 1. A workload collection can include one or more workloads.

The machine-readable instructions include machine learning model application instructions 404 to apply a machine learning model on the workload information. The machine learning model is trained using training information including features of different types of workloads.

The machine-readable instructions include file system identification instructions 406 to produce, by the machine learning model, an identification of a first file system from among different types of file systems. The machine learning model produces an output value corresponding to the first file system that is a candidate for use in storing files of the workload collection. For example, the output value corresponding to the first file system can be a probability value assigned to a workload domain label that represents a respective workload domain.

In some examples, the machine-readable instructions provision, for the workload collection, the file system based on the identification.

In some examples, the machine-readable instructions train the machine learning model based on extracting the features from input information, wherein the extracted features include features relating to I/O requests of the different types of workloads, and producing feature vectors of the extracted features.

In some examples, the training information includes the feature vectors that are labeled with respect to the different workload domains.

In some examples, the machine learning model predicts that the workload collection is part of a first workload domain of the different workload domains, and maps the first workload domain to the first file system.

In some examples, the features include any or some combination of: a size of a read, a size of a write, an indication of whether a workload is read intensive or write intensive, and an I/O pattern.

In some examples, the machine learning model assigns values to respective labels corresponding to the different types of file systems, where each value of the values indicates a likelihood of selecting a respective file system of the different types of file systems for the workload collection. The values can include probability values assigned to workload domain labels, which represent workload domains mapped by mapping information to respective file systems.

In some examples, each respective probability value of the probability values represents a likelihood that a corresponding workload domain label is a correct workload domain label.

Figure 5:
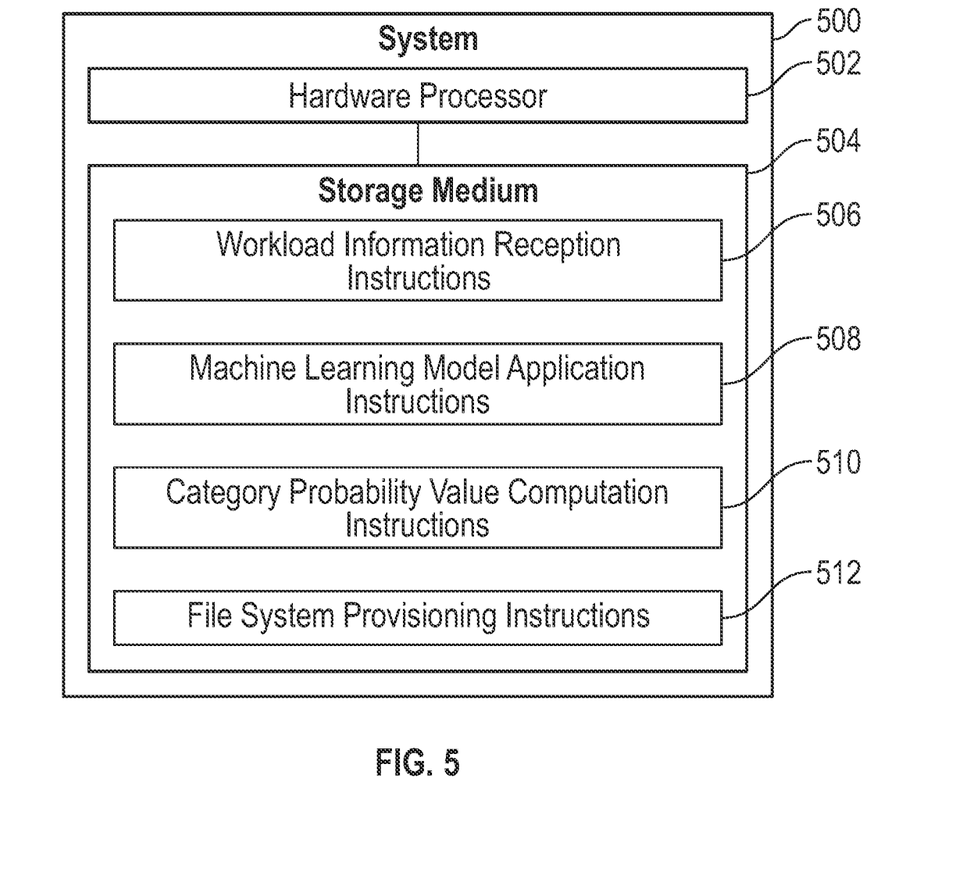
FIG. 5 is a block diagram of a system according to some examples.

FIG. 5 is a block diagram of a system 500 including a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include workload information reception instructions 506 to receive workload information of a workload collection.

The machine-readable instructions in the storage medium 504 include machine learning model application instructions 508 to apply a machine learning model on the workload information, the machine learning model trained using training information including features of different types of workloads.

The machine-readable instructions in the storage medium 504 include category probability value computation instructions 510 to produce, by the machine learning model, a probability value for a category corresponding to a first file system of different types of file systems.

In some examples, the category represents a first workload domain of a plurality of different workload domains, and the machine-readable instructions correlate the first workload domain to the first file system.

The machine-readable instructions in the storage medium 504 include file system provisioning instructions 512 to use the probability value for the category corresponding to the first file system in performing on-demand provisioning of the first file system for the workload collection, the first file system for use in storing files of the workload collection.

In some examples, the machine learning model produces probability values for multiple categories corresponding to multiple file systems of the different types of file systems, the machine-readable instructions identify, based on the probability values, that the first file system is optimal for the workload collection.

Figure 6:
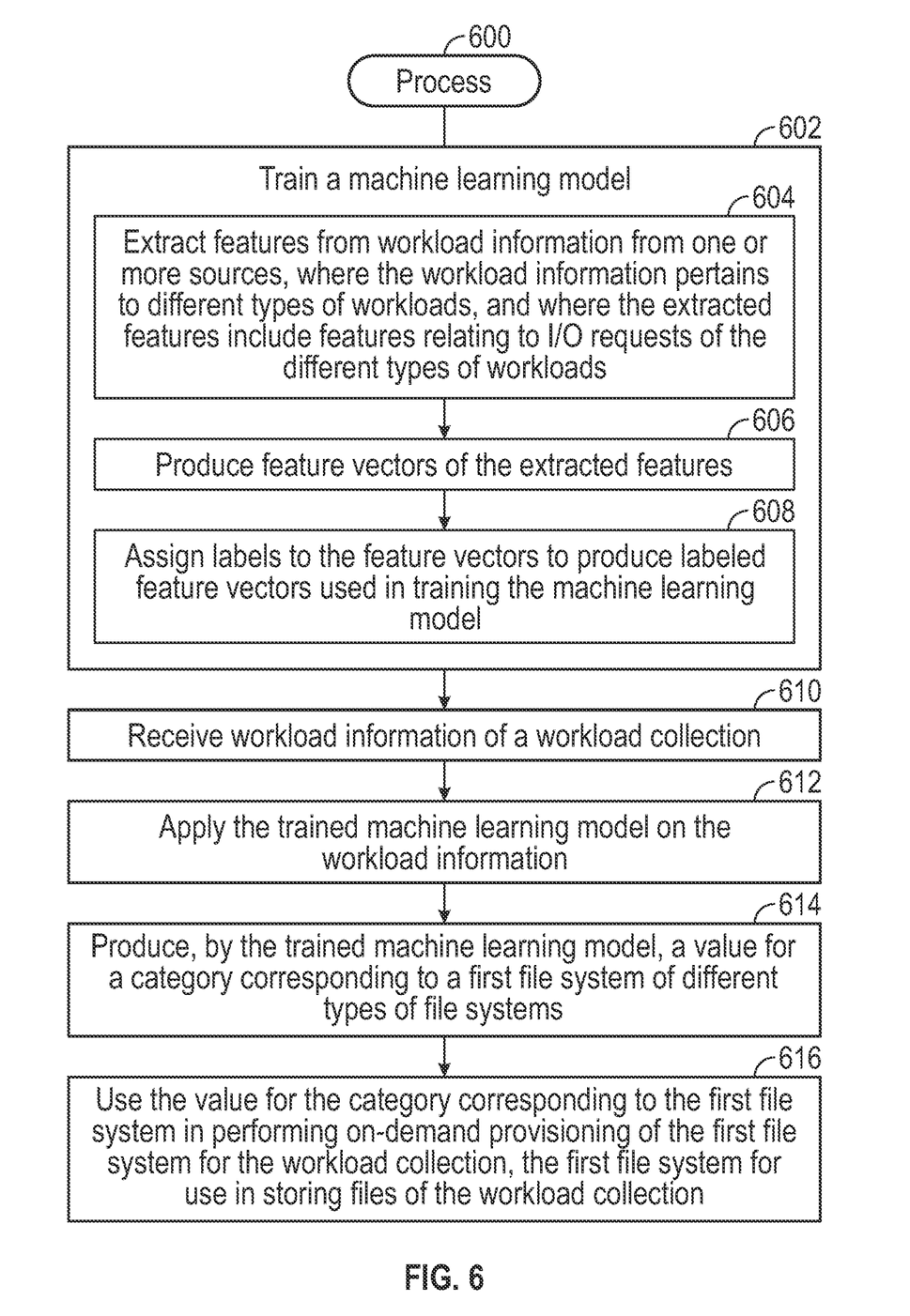
FIG. 6 is a flow diagram of a process according to some examples.

FIG. 6 is a flow diagram of a process 600 according to some examples.

The process 600 includes training (at 602) a machine learning model. The training includes extracting (at 604) features from workload information from one or more sources, where the workload information pertains to different types of workloads, and where the extracted features include features relating to I/O requests of the different types of workloads.

The training includes producing (at 606) feature vectors of the extracted features, and assigning (at 608) labels to the feature vectors to produce labeled feature vectors used in training the machine learning model.

The process 600 includes receiving (at 610) workload information of a workload collection.

The process 600 includes applying (at 612) the trained machine learning model on the workload information.

The process 600 includes producing (at 614), by the trained machine learning model, a value for a category corresponding to a first file system of different types of file systems. The value can be a probability value, and the category can represent a workload domain.

The process 600 includes using (at 616) the value for the category corresponding to the first file system in performing on-demand provisioning of the first file system for the workload collection, the first file system for use in storing files of the workload collection.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive workload information of a workload collection;
   apply a machine learning model on the workload information, the machine learning model trained using training information including features of different types of workloads;
   generate, by the machine learning model based on the workload information, a first file system label selected from among a plurality of file system labels representing different types of file systems;
   select, from among the different types of file systems, a first file system represented by the first file system label produced by the machine learning model from the workload information;
   provision the first file system in a computing system; and
   establish a connection between the provisioned first file system in the computing system and an entity that provided the workload collection to allow reading and writing of files in the provisioned first file system by the entity.

2. The non-transitory machine-readable storage medium of claim 1, wherein the instructions upon execution cause the system to:
   train the machine learning model comprising:
      extracting the features from input information, wherein the extracted features comprise features relating to input/output (I/O) requests of the different types of workloads, and
      producing feature vectors of the extracted features.

3. The non-transitory machine-readable storage medium of claim 2, wherein the training information comprises the feature vectors that are labeled with respect to different workload domains.

4. The non-transitory machine-readable storage medium of claim 1, wherein the instructions upon execution cause the system to:
   identify, by the machine learning model based on the workload information, a first type of workload domain from among a plurality of different types of workload domains; and
   generate the first file system label based on the identified first type of workload domain using mapping information that maps the different types of workload domains to the different types of file systems.

5. The non-transitory machine-readable storage medium of claim 2, wherein the features comprise any or some combination of: a size of a read, a size of a write, an indication of whether a workload is read intensive or write intensive, and an I/O pattern.

6. The non-transitory machine-readable storage medium of claim 2, wherein the training of the machine learning model further comprises:
- determining a measure of a performance of the machine learning model, and
- responsive to the measure not satisfying a criterion, perform another iteration of the training, wherein the training is re-iterated until a measure of the performance of the machine learning model satisfies the criterion in a current iteration.

7. The non-transitory machine-readable storage medium of claim 6, wherein each iteration of a plurality of iterations of the training updates parameters of the machine learning model.

8. The non-transitory machine-readable storage medium of claim 6, wherein the measure of the performance of the machine learning model comprises a loss produced by a loss function.

9. The non-transitory machine-readable storage medium of claim 1, wherein the instructions upon execution cause the system to:
- assign, by the machine learning model, values to respective file system labels of the plurality of file system labels, wherein each value of the values indicates a likelihood of selecting a respective file system of the different types of file systems for the workload collection.

10. The non-transitory machine-readable storage medium of claim 9, wherein the values comprise probability values, wherein each respective probability value of the probability values represents a likelihood that a corresponding file system label of the of the plurality of file system labels is a correct label.

11. The non-transitory machine-readable storage medium of claim 1, wherein the instructions upon execution cause the system to:
- generate, by the machine learning model based on the workload information, multiple file system labels selected from among the plurality of file system labels representing the different types of file systems, the multiple file system labels comprising the first file system label;
- based on the multiple file system labels generated by the machine learning model from the workload information, identify multiple candidate file systems from the different types of file systems;
- compare predicted performance measures of the multiple candidate file systems; and
- select the first file system from the multiple candidate file systems based on the comparing.

12. The non-transitory machine-readable storage medium of claim 1, wherein the instructions upon execution cause the system to:
- establish the connection by creating a mount point at which the provisioned first file system is accessible.

13. The non-transitory machine-readable storage medium of claim 1, wherein the instructions upon execution cause the system to:
- buffer input/output (I/O) requests of the workload collection in a virtual file system prior to the applying of the machine learning model on the workload information; and
- after the provisioning of the first file system, provide the buffered I/O requests to the provisioned first file system.

14. The non-transitory machine-readable storage medium of claim 1, wherein the provisioning of the first file system is on-demand provisioning of the first file system for the workload collection.

15. A system comprising:
- a processor; and
- a non-transitory machine-readable storage medium storing instructions executable on the processor to:
  - receive workload information of a workload collection;
  - apply a machine learning model on the workload information, the machine learning model trained using training information including features of different types of workloads;
  - generate, by the machine learning model based on the workload information, a first file system label selected from among a plurality of file system labels representing different types of file systems;
  - select, from among the different types of file systems, a first file system represented by the first file system label produced by the machine learning model from the workload information;
  - provision the first file system in a computing system; and
  - establish a connection between the provisioned first file system in the computing system and an entity that provided the workload collection to allow reading and writing of files in the provisioned first file system by the entity.

16. The system of claim 15, wherein the instructions are executable on the processor to:
- identify, by the machine learning model based on the workload information, a first type of workload domain from among a plurality of different types of workload domains; and
- generate the first file system label based on the identified first type of workload domain using mapping information that maps the different types of workload domains to the different types of file systems.

17. The system of claim 15, wherein the instructions are executable on the processor to:
- assign, by the machine learning model, probability values to respective file system labels of the plurality of file system labels, wherein each probability value of the probability values indicates a likelihood of selecting a respective file system of the different types of file systems for the workload collection; and
- identify, based on the probability values, that the first file system is optimal for the workload collection.

18. The system of claim 15, wherein the instructions are executable on the processor to:
- generate, by the machine learning model based on the workload information, multiple file system labels selected from among the plurality of file system labels representing the different types of file systems, the multiple file system labels comprising the first file system label;
- identify, based on the multiple file system labels generated by the machine learning model, multiple candidate file systems from the different types of file systems;
- compare predicted performance measures of the multiple candidate file systems; and
- select the first file system from the multiple candidate file systems based on the comparing.

19. A method of a system comprising a hardware processor, comprising:

training a machine learning model using training information including features of different types of workloads;

receiving workload information of a workload collection;

applying the trained machine learning model on the workload information;

generating, by the trained machine learning model based on the workload information, a first file system label selected from among a plurality of file system labels representing different types of file systems;

selecting, from among the different types of file systems, a first file system represented by the first file system label produced by the trained machine learning model from the workload information;

provisioning the first file system in a computing system; and establishing a connection between the provisioned first file system in the computing system and an entity that provided the workload collection to allow reading and writing of files in the provisioned first file system by the entity.

20. The method of claim 19, comprising:

generating, by the trained machine learning model based on the workload information, multiple file system labels selected from among the plurality of file system labels representing the different types of file systems, the multiple file system labels comprising the first file system label;

identifying, by the system based on the multiple file system labels generated by the machine learning model, multiple candidate file systems from the different types of file systems;

comparing, by the system, predicted performance measures of the multiple candidate file systems; and selecting, by the system, the first file system from the multiple candidate file systems based on the comparing.

* * * * *